Feb. 7, 1967 KAZUHIRO MORIYAMA 3,302,254
APPARATUS THAT AUTOMATICALLY CONTROLS THE CORRELATION
BETWEEN TIME AND AIR-PRESSURE
Filed Oct. 1, 1963
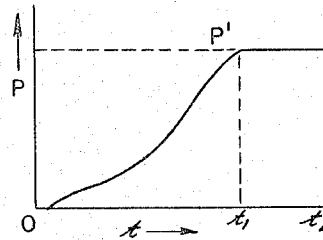
FIG. 1
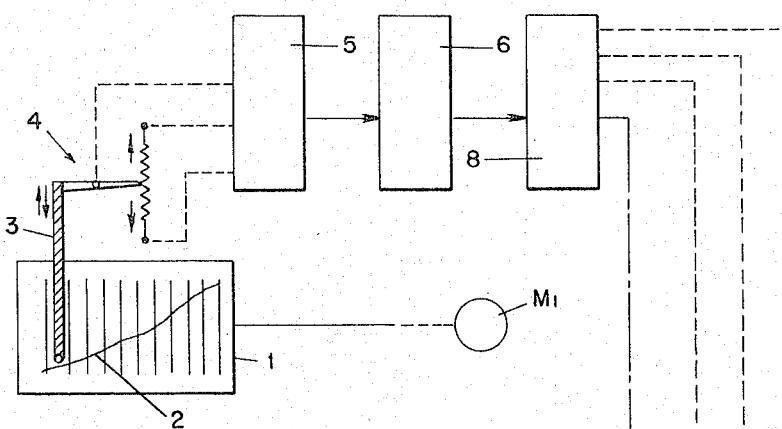
FIG. 2
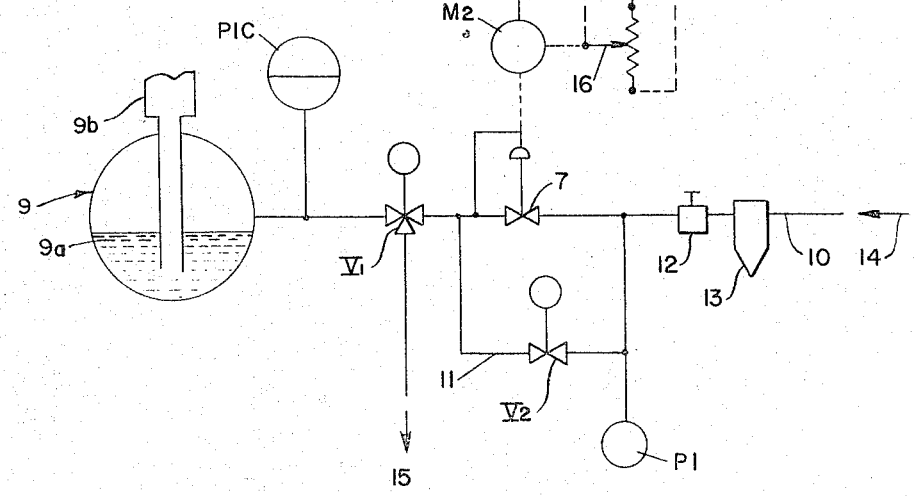
INVENTOR:
KAZUHIRO MORIYAMA
BY Nolte & Nolte
ATTORNEYS

United States Patent Office 3,302,254
Patented Feb. 7, 1967

3,302,254
APPARATUS THAT AUTOMATICALLY CONTROLS THE CORRELATION BETWEEN TIME AND AIR-PRESSURE
Kazuhiro Moriyama, Setagaya-ku, Tokyo-to, Japan, assignor to Ishikawajima-Harima Jukogyo Kabushiki Kaisha, Tokyo-to, Japan, a company of Japan
Filed Oct. 1, 1963, Ser. No. 313,104
Claims priority, application Japan, Oct. 4, 1962, 37/42,899
3 Claims. (Cl. 22—69)

The present invention relates to an apparatus for automatically controlling the correlation between time and air-pressure to be used in the automatic control of the pressure in the case of low-pressure die-casting.

In the case of low-pressure die-casting, for example, in order to fill up the cavity with molten metal, it is necessary that air-pressure P of about 0~1 kg./cm.$^2$ be forced onto the surface of the molten metal in the crucible slowly, substantially as is shown by the gradual rise with time of the pressure curve in FIG. 1, and then keep the pressure P' constant for a given time.

Such operations have been generally done by regulating with hands the opening and closing of pressure valves. There have been many problems to be improved: it was very difficult in such cases to control exactly the correlation between time and air-pressure, and usually the quality of casting was not stable because the molten metal tended to be forced into the cavity too quickly, and the operation could not be repeated easily in the case when several castings of the same quality was desired.

The present invention, with a view to improve such problems, made it possible to reliably and automatically control the pressure in the pressure-vessel in accordance with a program curve representing a function of time and pressure and which is previously set on a program board. The invention will become more readily apparent from the following description of a preferred embodiment thereof shown, by way of example, in the accompanying drawing, in which:

FIG. 1 is a diagram showing an example of a program preset on a programming board, the curve representing the relation between time and air-pressure;

FIG. 2 is a diagram of the pressure control system embodying principles of the present invention.

With reference to the figures, the program board 1 is shown to have time-graduations extending horizontally and pressure-graduations extending vertically. The board is equipped with a belt 2 which is made from a material which is adapted to be adjusted to any desired curve.

This program board 1 can be travelled along the direction of the time-graduation with constant speed by the motor $M_1$, and by this travel the trace-bar 3, which moves along the curve of the belt 2 in engagement therewith, changes its vertical position along the direction of the pressure-graduation.

The other end of the trace-bar 3 is connected mechanically to a potentiometer 4 (of the known type in which the resistance may be changed by a slider arm), and, by the travel of the program board 1 along the time graduation, develops a voltage ratio, in accordance with the curvature of the belt 2, which is then fed to a proportional band controlling means 5, which might be of a type capable of retaining its input signal within predetermined limits.

To proportional band controlling means a hand reset 6 is connected and operates to correct electrically the difference in case such difference appears between the curve of the belt of the program-board and the answering position of the electric controlling valve 7, which will be hereinafter described.

A balancing relay 8 is connected to the output of the hand reset 6 and regulates the opening of the electric controlling valve 7, which is set in the air pipe 10 leading to the pressure-vessel (for example: furnace), in accordance with the position of the trace-bar 3.

Of course the electric controlling valve 7 is so constructed as the ratio between its displacement and its controlling pressure should be kept constant.

In FIG. 2, PIC is a controller which indicates the relation between time and air-pressure actually existing in the vessel and which has a main contact to respond to a predetermined pressure and to activate any known type timer (not shown). The controller PIC includes also an auxiliary contact to perform certain operations hereinafter described upon passing of the period set by the timer, $V_1$ is a three-way electro-magnetic valve for exhausting and feeding air from vessel 9, $V_2$ is a by-pass electro-magnetic valve which is set in the by-pass line 11 that is set across the electric controlling valve 7. $P_1$ is a pressure indicator, 12 is a reducing valve, 13 is the filter, 14 is the arrow which indicates the direction of the air flowing in, 15 is the arrow which indicates the direction of the discharged air, $M_2$ is the motor for controlling the opening of the electric controlling valve 7 in response to the balancing relay 8, and a potentiometer 16 for fine adjustments.

After the belt curve of the program board 1 having been set properly, the starting switch is pushed, and then the by-pass electro-magnetic valve $V_2$ is closed, and the three-way electro-magnetic valve for exhausting and feeding air $V_1$ is opened towards the inhaling side, and, the program board travels from right to left with a constant speed being driven by the motor $M_1$, whereupon the position of the trace-bar is changed, as said before, in accordance with the curve of the belt 2 on the program board, and, in proportion with such change of the position of the trace-bar, a changing voltage ratio is developed by the potentiometer and fed through the proportional band controlling means 5 to motor $M_2$ which opens the electric controlling valve 7 in accordance with the curve of the belt 2, and, accordingly, the pressure within the pressure-vessel 9 is becoming gradually raised and the molten metal 9a is forced into mold 9b.

When the program board has traveled as far as the left end which in the illustrative example of FIG. 1 is shown by $t_1$, it will turn back automatically towards right and does not move until the starting switch is pushed down again.

When the pressure of the pressure-vessel 9 thus reaches a desired magnitude, say $P_1$ at $t_1$ as in the illustrated example of FIG. 1, the main contact of the indicator-controller PIC is actuated and the timer is started, whereupon a constant pressure is given to the pressure-vessel 9 after the by-pass electro-magnetic valve $V_2$ is opened. The pressure in the vessel is then kept constant during the time $t_1-t_2$ (in FIG. 1) as set by the timer.

When such prescribed time has elapsed, the auxiliary contact is actuated, and the three-way electro-magnetic valve for exhausting and feeding air $V_1$ is switched to the exhaust side.

If it is not necessary to keep the pressure constant, that is, if the time period $t_1-t_2=0$, the three-way electro-magnetic valve for exhausting and feeding air $V_1$ is at once switched to the exhaust side as soon as the pressure reaches the desired magnitude illustrated as $P_1$, provided that the timer-cancel-switch (not shown in the figure) is turned on.

Thus, when the present invention is used, the pressure in the pressure-vessel can be automatically controlled, in accordance with the belt curve set at any desired configuration on the program board 1, only by pushing down the button for starting, and especially the present invention has proved to be greatly effective in controlling the pressure in a crucible at the time of low-pressure diecasting.

What I claim is:

1. In an apparatus for controlling a casting process in which a molten metal body is raised from a vessel into a mold by application of a pressurized medium to the surface of the molten metal in the vessel, a pneumatic circuit for applying pressure to said vessel and for raising said molten metal into said mold, programming means including a time-pressure curve following means adapted to trace a predetermined time-pressure curve, potentiometer means connected to respond to said time-pressure curve following means for developing an output signal in proportion to said curve, first valve means disposed in said pneumatic circuit and being responsive to said output signal for opening said pneumatic circuit in response thereto and permitting said pressurized medium to enter said vessel in accordance with said time-pressure curve, pressure responsive means for sensing the pressure in said vessel upon said molten metal body and actuating a timing means upon said pressure reaching a predetermined magnitude, means supplying a constant pressure to said vessel during a period said timing means is in operation, and relief valve means disposed in said pneumatic circuit for releasing pressure from said vessel after lapse of said period.

2. The combination as claimed in claim 1, wherein said constant pressure supplying means comprises a by-pass pneumatic circuit disposed across said first valve means, said by-pass pneumatic circuit including by-pass valve means responsive to said timing means for opening said by-pass circuit upon starting of said period.

3. The combination as claimed in claim 1, wherein said programming means comprises a board having a time-pressure curve thereon, said time-pressure curve is formed on said board by mechanical means having a surface, said time-pressure curve following means including a tracing arm connected to said potentiometer means and adapted to slide on said surface.

References Cited by the Examiner

UNITED STATES PATENTS 3,006,043   10/1961   Goldhammer _____ 22—209 XR

FOREIGN PATENTS 236,238   8/1960   Australia.
158,102   3/1957   Sweden.

J. SPENCER OVERHOLSER, *Primary Examiner.*

R. S. ANNEAR, *Assistant Examiner.*